（12) United States Patent
Ding

(10) Patent No.: US 10,183,579 B2
(45) Date of Patent: *Jan. 22, 2019

(54) CLUSTERED INSTRUMENT PANEL IN A TRANSPORTATION APPARATUS

(71) Applicant: Thunder Power New Energy Vehicle Development Company Limited, Central (HK)

(72) Inventor: Jia-Wei Ding, Taipei (TW)

(73) Assignee: Thunder Power New Energy Vehicle Development Company Limited, Central (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/692,174

(22) Filed: Aug. 31, 2017

(65) Prior Publication Data

US 2017/0361710 A1  Dec. 21, 2017

Related U.S. Application Data

(63) Continuation of application No. 15/458,449, filed on Mar. 14, 2017, now Pat. No. 9,770,988, which is a
(Continued)

(51) Int. Cl.
*B60K 37/02* (2006.01)
*B60K 37/06* (2006.01)

(52) U.S. Cl.
CPC ............. *B60K 37/02* (2013.01); *B60K 37/06* (2013.01); *B60K 2350/1072* (2013.01);
(Continued)

(58) Field of Classification Search
CPC ........ B60K 35/00; B60K 37/00; B60K 37/02; B60K 2350/00; B60K 2350/10;
(Continued)

(56) References Cited

U.S. PATENT DOCUMENTS 5,764,139 A  6/1998 Nojima et al.
6,028,537 A  2/2000 Suman et al.
(Continued)

FOREIGN PATENT DOCUMENTS

CN  1424968 A  6/2003
CN  206049363 U  3/2017

OTHER PUBLICATIONS

European Office Action for EP 16188746.8 dated Dec. 20, 2017, all pages.
(Continued)

*Primary Examiner* — Ojiako K Nwugo
(74) *Attorney, Agent, or Firm* — Kilpatrick Townsend & Stockton LLP

(57) ABSTRACT

A clustered instrument panel on a display of a dashboard in a transportation apparatus is disclosed. The clustered instrument panel may be used to combine multiple individual instrument panels, such as the odometer, tachometer, temperature meter, battery meter, navigation screen and any other instrument panels that are traditionally presented separate and independent from other instrument panels. The individual instrument panels may be layered on top of each other to form the clustered instrument panel, with gradual increase in size from the first instrument panel to the nth instrument panel. Information associated with a given instrument panel in the clustered instrument panel may be presented in the gap area between the given instrument panel and the neighbor instrument panel in the clustered instrument panel. In one embodiment, the clustered instrument panel is a triple-circle meter.

13 Claims, 8 Drawing Sheets

Related U.S. Application Data continuation of application No. 14/967,380, filed on Dec. 14, 2015, now Pat. No. 9,616,751, which is a continuation of application No. 14/854,052, filed on Sep. 15, 2015, now Pat. No. 9,610,841.

(52) U.S. Cl.
CPC  *B60K 2350/1076* (2013.01); *B60K 2350/403* (2013.01); *B60K 2350/908* (2013.01)

(58) Field of Classification Search
CPC .... B60K 2350/1064; B60K 2350/1072; B60K 2350/908; B60K 2350/1076; B60K 2350/1096
USPC ...................... 340/438, 461, 462; 345/30, 31
See application file for complete search history.

(56) References Cited

U.S. PATENT DOCUMENTS

| | | |
|---|---|---|
| 6,181,301 B1 | 1/2001 | Inoguchi et al. |
| 7,382,237 B2 | 6/2008 | Stoschek et al. |
| 7,683,771 B1 | 3/2010 | Loeb |
| 8,319,665 B2 | 11/2012 | Weinmann et al. |
| 8,344,870 B2 | 1/2013 | Evans et al. |
| 8,542,108 B1 | 9/2013 | Izdepski et al. |
| 9,610,841 B1 | 4/2017 | Ding |
| 9,616,751 B2 | 4/2017 | Ding |
| 9,770,988 B2 | 9/2017 | Ding |
| 2005/0083185 A1 | 4/2005 | Wang |
| 2006/0017585 A1 | 1/2006 | Lenneman et al. |
| 2007/0090939 A1 | 4/2007 | Takato |
| 2007/0132572 A1 | 6/2007 | Itoh et al. |
| 2008/0211652 A1 | 9/2008 | Cope et al. |
| 2009/0085880 A1 | 4/2009 | Vitale et al. |
| 2010/0259375 A1 | 10/2010 | Ferren et al. |
| 2011/0107272 A1 | 5/2011 | Aguilar |
| 2013/0207794 A1 | 8/2013 | Patel et al. |
| 2014/0136735 A1 | 5/2014 | Polehn |
| 2015/0084764 A1 | 3/2015 | Wunsche |
| 2017/0168702 A1 | 6/2017 | Ding |

OTHER PUBLICATIONS

First Office Action and Search Report for CN201610390416.8 dated Jan. 29, 2018, 10 pages.
U.S. Appl. No. 15/458,449, filed Mar. 14, 2017, Ex Parte Qualye Action dated Apr. 18, 2017, all pages.
U.S. Appl. No. 15/458,449, filed Mar. 14, 2017, Notice of Allowance dated May 19, 2017, all pages.
U.S. Appl. No. 14/854,052, filed Sep. 15, 2015, Non-Final Rejection dated May 16, 2016, all pages.
U.S. Appl. No. 14/854,052, filed Sep. 15, 2015,Notice of Allowance dated Nov. 18, 2016, all pages.
U.S. Appl. No. 14/967,380, filed Dec. 14, 2015, Non-Final Rejection dated May 16, 2016, all pages.
U.S. Appl. No. 14/967,380, filed Dec. 14, 2015, Notice of Allowance dated Dec. 2, 2016, all pages.

CLUSTERED INSTRUMENT PANEL IN A TRANSPORTATION APPARATUS

CROSS-REFERENCES TO RELATED APPLICATIONS

The present application is a continuation of U.S. Nonprovisional application Ser. No. 15/458,449, filed Mar. 14, 2017, now U.S. Pat. No. 9,770,988, issued Sep. 26, 2017, which is a continuation of U.S. Nonprovisional application Ser. No. 14/967,380, filed Dec. 14, 2015, now U.S. Pat. No. 9,616,751, issued Apr. 11, 2017, which is a continuation of U.S. Nonprovisional application Ser. No. 14/854,052, filed Sep. 15, 2015, now U.S. Pat. No. 9,610,841, issued Apr. 4, 2017, the entire disclosures of which are hereby incorporated by reference for all purposes.

FIELD OF THE INVENTION

The invention generally relates to instrument panels in a transportation apparatus.

BACKGROUND OF THE INVENTION

Communication of various vehicle parameters to a driver is through instrument panels, such as a tachometer, a speedometer, an odometer, a trip odometer, a fuel indicator, a temperature indicator, and various indicators (e.g., maintenance, brake, oil change, tire pressure, door, airbag, seat belt and other indicators). A conventional instrument panel typically includes a round assembly having a pointing hand that provides an indication of a current reading of a vehicle parameter—e.g., speed, fuel level, rotation speed of the engine (RPM), current trip distance, total distance in the lifetime of the vehicle, engine temperature, temperature inside the vehicle.

Conventionally, placement of instrument panels in a vehicle is typically fixed with each instrument panel being separate and independent from each other. For example, speed information is conveyed through a speedometer separate and independent from the RPM information conveyed through a tachometer. Thus, a round assembly representing the speedometer is typically placed in the center of instrument display area right in front of the driver and the tachometer is typically place on the left side of the instrument display area.

A few drawbacks are associated with the separate and independent placement of the conventional instrument panels. First, certain types of vehicle, such as motorcycle or scooter, have fairly limited space for the instrument display area. Communication of other information for those types of vehicle becomes a challenge when speed, fuel, battery and RPM panels already occupy their designated spaces on the instrument display area. Second, vehicle driving is increasingly embodied in information communication to the driver(s) and passenger(s) of the vehicle. For example, entertainment information in a video screen on the dashboard of the vehicle is more and more desired by the driver(s) of the vehicle, and so are notifications regarding incoming text and calls, information regarding area(s) the vehicle is traveling in, environment temperature, etc. With more and more of such information is desired, it is a challenge to present all of such information on the dashboard when various instrument panels have already occupy a sizeable amount of space on the driver side dashboard.

Developments in liquid crystal display (LCD) technology have made free-form display on a dashboard a reality. Equipped with the new free-form display technology, a LCD screen can be snipped and shaped to fit virtually any layout design on a dashboard and to fill the entire surface area of the dashboard. The free-form display's flexibility makes it possible to integrate every necessary monitor or gauge, from speedometer to odometer, into a single instrument panel.

SUMMARY OF THE INVENTION

In accordance with one aspect of the invention, a clustered instrument panel in a transportation apparatus is disclosed. Individual instrument panels representing speedometer, tachometer, odometer, temperature-meter (e.g., engine or environment), various indicators and any other instrument panels may be combined to be layered on top of each other to form the clustered instrument panel. In some embodiments, N number of instrument panels may be arranged on a same center point gradually increasing in size, with the first instrument panel being smallest in size and the Nth instrument panel being largest in size. Information associated with each of the N number of instrument panels may be presented in the gap areas of the instrument panels. For example, information associated with third instrument panel may be presented at the gap area between the third and second instrument panels; and information associated with Nth information panel may be presented in the gap area between Nth and (N−1)th instrument panels. Information associated with the first information panel may be presented inside the first information panel. In some embodiments, the clustered instrument panels are concentric rings. In one embodiment, a triple-circle meter formed by three concentric rings presents three sets of information. Compared with the traditional instrument panels, the clustered instrument panel in accordance with the disclosure may compact several instrument panels into one combined display and thus save display real estate on the dashboard.

In accordance with another aspect of the disclosure, a user of the transportation apparatus (e.g., the driver) may be enabled to configure the clustered instrument panel. For example, the user may be enabled to combine the speedometer, battery meter, and the environment climate meter into one triple-circle meter for presentation on the dashboard. Subsequently, the user may be enabled to reconfigure the triple-circle meter to include the speedometer, tachometer, and a notification screen. Such flexible configuration of display of instrument panels enables the user to decide a logical and convenient display of driving information for presentation in the clustered instrument panel.

Other objects and advantages of the invention will be apparent to those skilled in the art based on the following drawings and detailed description.

DETAILED DESCRIPTION

Figure 1:
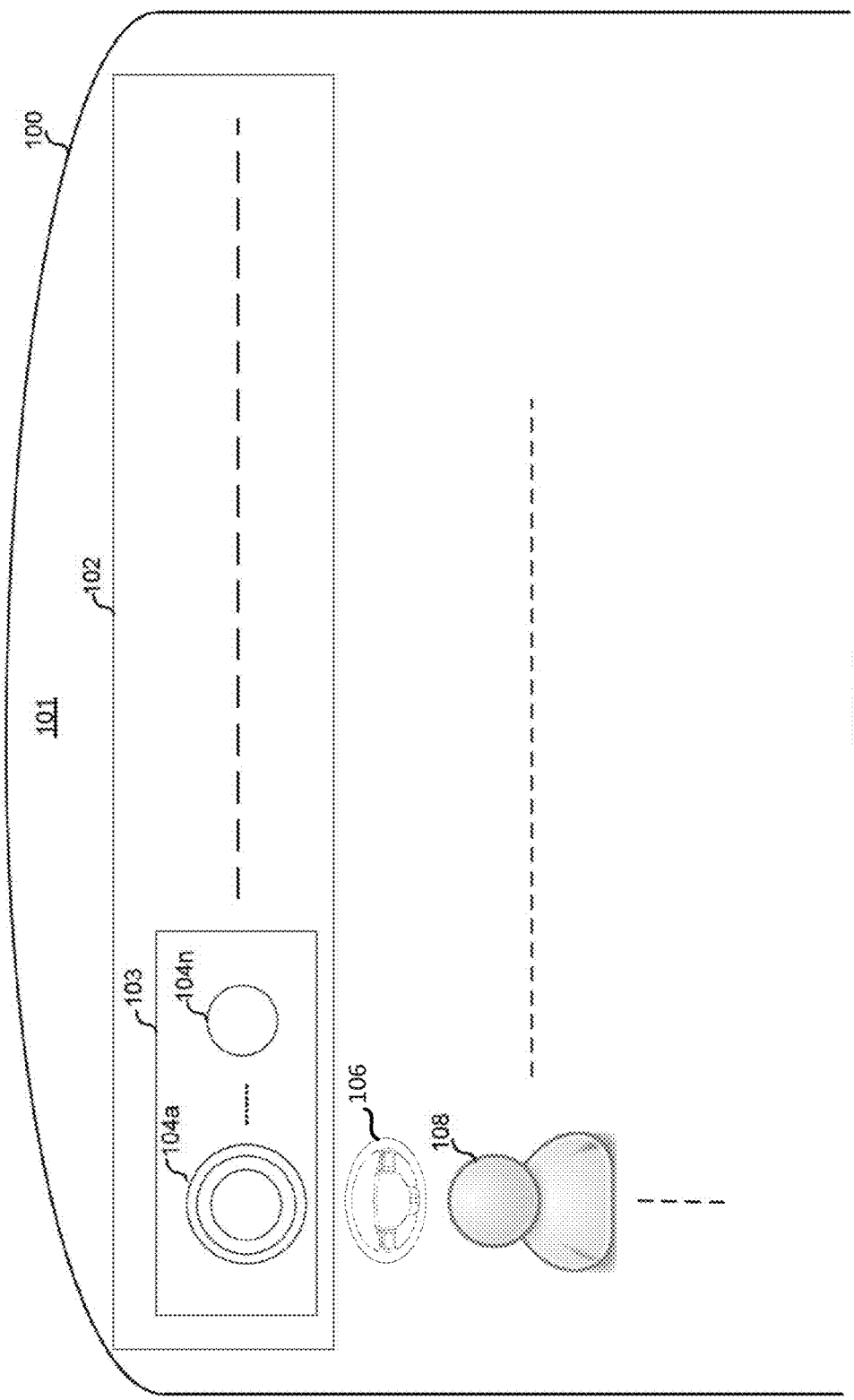
FIG. 1 generally illustrates one embodiment of a clustered instrument panel in a transportation apparatus in accordance with the disclosure.

FIG. 1 generally illustrates one embodiment of a clustered information panel in a transportation apparatus 100 in accordance with the disclosure. Examples of transportation apparatus 100 may include a vehicle such as a car, a motorcycle, a scooter, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, the transportation apparatus 100 is an electrical automobile. As shown, the transportation apparatus 100 may include a cabin 101 with a volume. However, this is not intended to be limiting. In some embodiments in accordance with the disclosure, the transportation apparatus 100 may not have a volume 101. For example, in one embodiment, the transportation apparatus 100 is an electrical scooter and does not have a volume.

As shown in FIG. 1, the transportation apparatus 100 may have a dashboard 102 with a display 103, for example a LCD screen 103. The display 103 may be suitable to display one or more information panels, such as the information panels 104a-n shown in FIG. 1. As also shown, the displays of respective individual information panels on the display 103 are separate and independent from each other such that the individual information panels 104 are displayed at corresponding positions on the display 103. In this example, instrument panel 104a is a clustered instrument panel comprising multiple instrument panels and instrument panel 104b is an individual instrument panel. Clustered instrument panel 104a will be described in great detail below. Although two instrument panels are shown in this example as being displayed in the display 103, this is not intended to be limiting. It should be appreciated the display 103 may display more or fewer instrument panels than those shown in FIG. 1 in other examples. As also shown, the number of displays 103 on the dashboard may also vary in other examples. For instance, in one embodiment, there are three displays 103 on the dashboard. In some examples, the display 103 may fill the entire dashboard 102.

In any case, the instrument panels 104 may convey gauge information related to the transportation apparatus 100, such as current speed/altitude/direction/wind, current longitude/latitude, distance traveled, RPM, fuel level, battery level, and/or any other gauge information related to the transportation apparatus 100. In some examples, information presented in the instrument panels 104 may include indication information, such as seat belt, airbag, door, trunk, maintenance, safety, window lock, door lock indication information or any other indication information. In some examples, information presented in the instrument panels 104 may include navigational or GPS information related to navigation of the transportation apparatus 100, such as current street traveled on, map of an area the transportation apparatus 100 is traveling in, the destination information, direction instructions, traffic condition, estimated arrival time, estimated delay due to traffic, and/or any other navigation information. In some examples, information presented in the instrument panels 104 may include cabin information, such as current cabin environment temperature, humidity, wind speed, number of passengers in one or more zones in the cabin and/or any other cabin information. In some examples, information presented in the instrument panels 104 may include configuration information regarding the transportation apparatus 100, such as seat configuration, mirror configuration, battery configuration, driving mode configuration, and/or any other configuration. In some examples, information presented in the instrument panels 104 may include notification information such as incoming call, incoming text message, incoming video chat request, and/or any other notification information. Other examples of information panels 104 are contemplated.

In accordance with the disclosure, the individual information panels 104 may be displayed on the display 103 at corresponding positions as desired by the user(s) 108. In one embodiment, the information panels 104 are displayed at their default positions on the display 103. As will be discussed in further detail below, the present disclosure enables the user(s) of the transportation apparatus 100 to configure the clustered instrument panel 104 to display individual instrument panels layered on top of each other.

As still shown in FIG. 1, the transportation apparatus 100 may comprise one or more steering wheels 106. Although only one steering wheel 106 is shown in FIG. 1, this is not intended to be limiting. In some examples, the transportation apparatus 100 may include more than one steering wheel 106. For example, it is contemplated that the transportation apparatus 100 may be an aircraft that comprises at least a main steering wheel 106 for the main pilot and at least a secondary steering wheel 106 for a co-pilot.

As also shown in FIG. 1, one or more users 108 may be arranged to occupy their corresponding positions. The user(s) 108 may include one or more drivers that control the movement or navigation of the transportation apparatus 100, one or more passengers, and/or any other type of user 108. In this example, the user 108 is a driver that controls the driving of the transportation apparatus 100.

Figure 2:
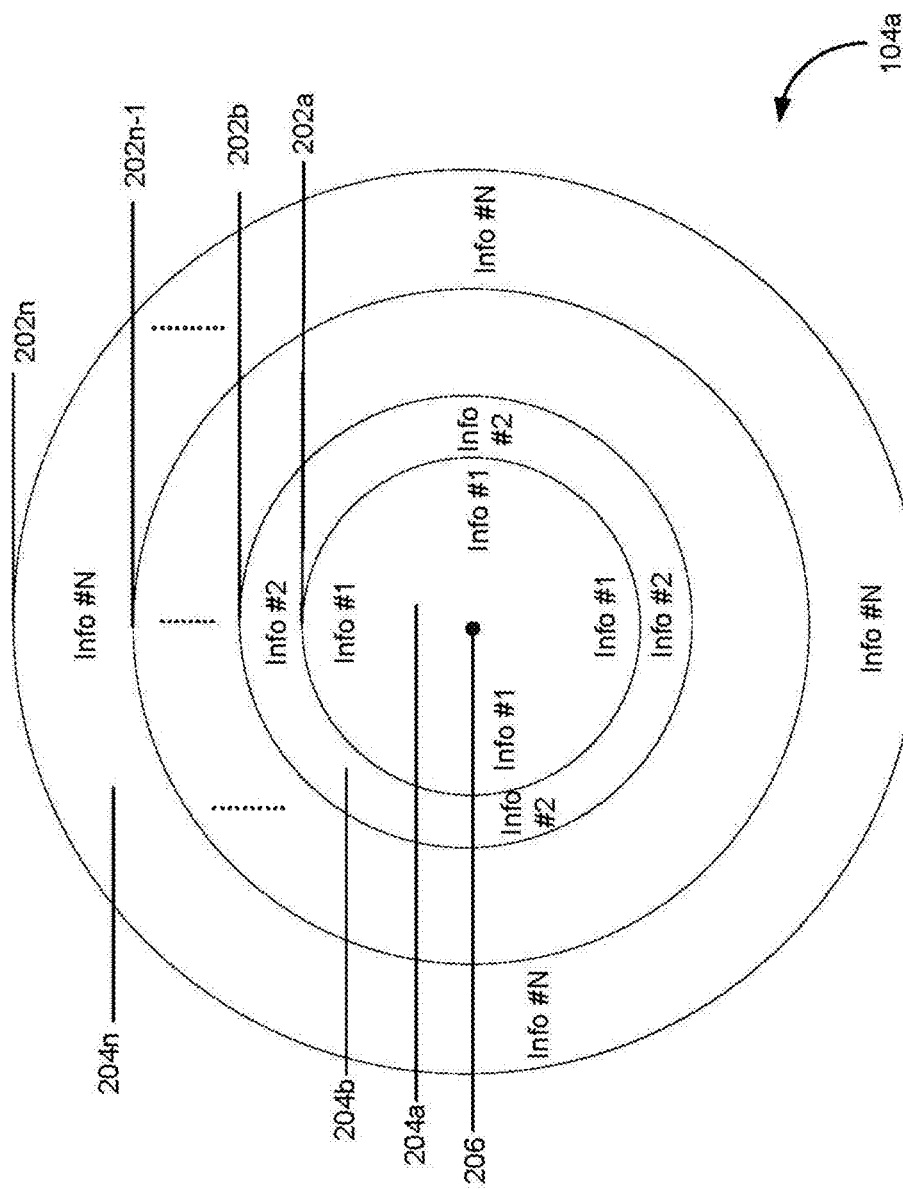
FIG. 2 generally illustrates the clustered instrument panel shown in FIG. 1 in accordance with one embodiment of the disclosure.

With the arrangement of instrument panels 104 on the dashboard 102 in the transportation apparatus 100 having been generally described, attention is now directed to FIG. 2. FIG. 2 generally illustrates the clustered instrument panel 104a in accordance with one embodiment of the disclosure. FIG. 2 will be described with reference to FIG. 1. As shown in FIG. 2, the clustered instrument panel 104a shown in FIG. 1 may comprise individual instrument panels 202, such as instrument panels 202a, 202b, 202n-1 and 202n, layered on each other. In this example, the individual instrument panels 202 included in the clustered instrument panel 104a are substantially circular in shape. However, this is not intended to be limiting. It is contemplated that in some examples, the individual instrument panels 202 included in the instrument panel 104a may be of any regular or irregular shapes. For instance, in one embodiment, the individual instrument panels 202 may be of rectangular shapes. It should be also understood, although each of the instrument panels 202 in this example is of the same circular shape, this is not intended to be limiting. In some examples, the shapes of the individual instrument panels 202 included in the clustered instrument panel 104a may be of a variety of different shapes. For example, in one embodiment of the clustered instrument panel 104, some of the instrument panels 202 are of circular shapes, some of the instrument panels 202 are of rectangular shapes, and some of the instrument panels 202 are of triangular shapes.

As shown, the individual instrument panels 202 included in the clustered instrument panel 104 may be arranged to center on a same center point 206. However, this is not intended to be limiting. In some other examples, the individual instrument panels 202 may not be centered on the same center point. In any case, the individual instrument panels 202 may be arranged increasing in size such that the innermost instrument panel 202a has the smallest size, and the outermost instrument panel 202n has the largest size. As shown, the gradual size differences between the individual instrument panel 202 create gap areas 204, such as the gap areas 204a, 204b and 204n.

As illustrated in FIG. 2, without limitation, information #N, which would otherwise be displayed in an individual instrument panel #N, is presented in the gap area 204n between instrument panel 202n and 202n-1 in the instrument panel 104a. For example, without limitation, information #N may include speed information regarding the transportation apparatus 100. As still further illustrated, information #2, which would otherwise be displayed in an individual instrument panel #2, is presented in the gap area 204b between the instrument panel 202b and instrument panel 202a. For example, without limitation, information #2 may include battery information regarding the transportation apparatus 100.

As also illustrated in FIG. 2, information #1, which is presented in the surface area of the instrument panel 204a. That is, the entire surface of the inner most instrument panel 204a may be used to display information #1. For example, information #1 may include environment temperature information. As should be clear, the number of instrument panels 202 that may be included in the clustered instrument panel 104a in accordance with the disclosure may vary in different examples as however desired by the user(s) or the manufacturer of the transportation apparatus 100.

Figure 3:
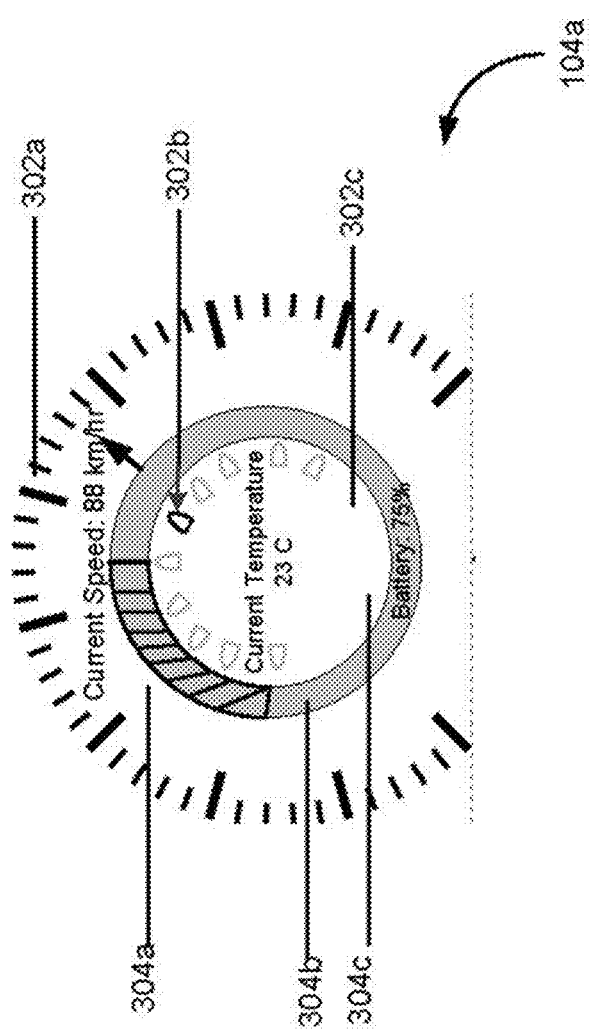
FIG. 3 illustrates one example of a clustered instrument panel in accordance with the disclosure.

FIG. 3 illustrates one example of the clustered instrument panel 104a in accordance with the disclosure. It will be described with reference to FIG. 1. In this example, the clustered instrument panel 104a comprises three individual instrument panels 302, i.e., instrument panels 302a-c. In this example, instrument panel 302a is a speedometer that communicates current speed of the transportation apparatus 100 to the user(s) of the transportation apparatus 100, e.g., driver(s) and/or the passenger(s) of the transportation apparatus 100. As shown, the speedometer 302a is arranged as the outer most instrument panel in the clustered instrument panel 104a, and the current reading of the speed is presented in the gap area 304a. Instrument panel 302b is a battery level meter that communicates the remaining battery power of the transportation apparatus 100 to the user(s) of the transportation apparatus 100. As shown, the reading of the remaining battery power and its visual representation may be presented in the gap area 304b. Instrument panel 302c is a temperature meter that communicates the current environment temperature within the transportation apparatus 100. As shown, the reading of the current environment temperature is presented in the surface area 304c of the instrument panel 302c.

Returning to FIG. 1, as shown, the clustered instrument panel 104a may be displayed at a corresponding position in the display 103 along with other instrument panel(s) and/or information panel(s). The default display position of the clustered instrument panel 104a may be designated by the manufacturer of the transportation apparatus 100; and the user(s) of the transportation apparatus 100 (e.g., the driver(s) or the passenger(s)) may be enabled to configure the default display position of the clustered instrument panel 104a on the display 103.

Figure 4A:
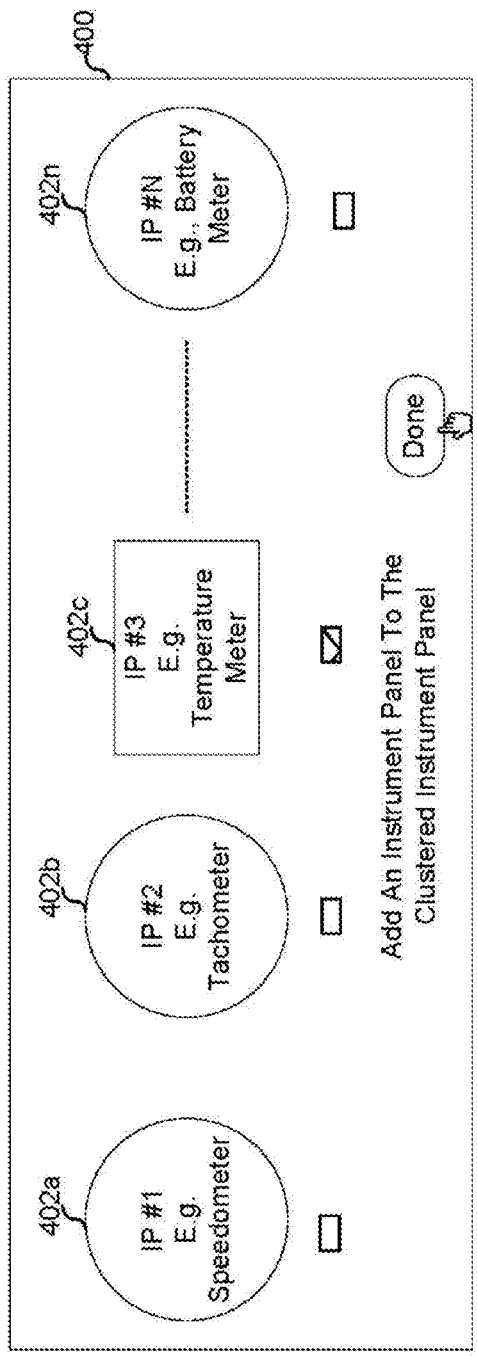
FIG. 4A illustrates an exemplary interface facilitating the user(s) of the transportation apparatus to configure the clustered instrument panel shown in FIG. 1 to add one or more instrument panels.

In some examples, the user(s) of the transportation apparatus 100 may be enabled to selectively configure which ones of the instrument panels may be added to the clustered instrument panel 104a. FIG. 4A illustrates an interface 400 facilitating the user(s) of the transportation apparatus 100 to configure the clustered instrument panel 104a to add one or more instrument panels. It will be described with reference to FIG. 1. The interface 400 may be implemented in a variety of ways. For example, the interface 400 may be implemented and presented on the display 103 of the dashboard 102. In that example, the interface 400 may be a touch-sensitive interface capable of receiving touch signals from the user(s) of the transportation apparatus 100. In another example, the interface 400 may be implemented and presented on a smartphone or tablet associated with the user(s) of the transportation apparatus 100. For instance, the interface 400 may be a screen in an app associated with the transportation apparatus 100 implemented on the smartphone associated with the user(s) of the transportation apparatus 100. Still in another example, the interface 400 may be implemented and presented on a computer (e.g., a laptop or desktop computer) associated with the user(s) of the transportation apparatus 100. In that example, the interface 400 may be configured to receive user inputs and transmit the user inputs, either directly or via a server, to the transportation apparatus 100 for configuring the clustered panel 104a.

In any case, as shown, the interface 400 may present N number of instrument panels 402a-n for user configuration such that they may be included and displayed in the clustered instrument panel 104a. As shown, the interface 400 may include selection boxes enabling the user(s) of the transportation apparatus 100 to select individual instrument panels 402 to be added to the clustered instrument panel 104a. In this example, as illustrated, instrument panel 402c is selected by the user(s) of the transportation apparatus 100 to be included in the clustered instrument panel 104a.

Figure 4B:
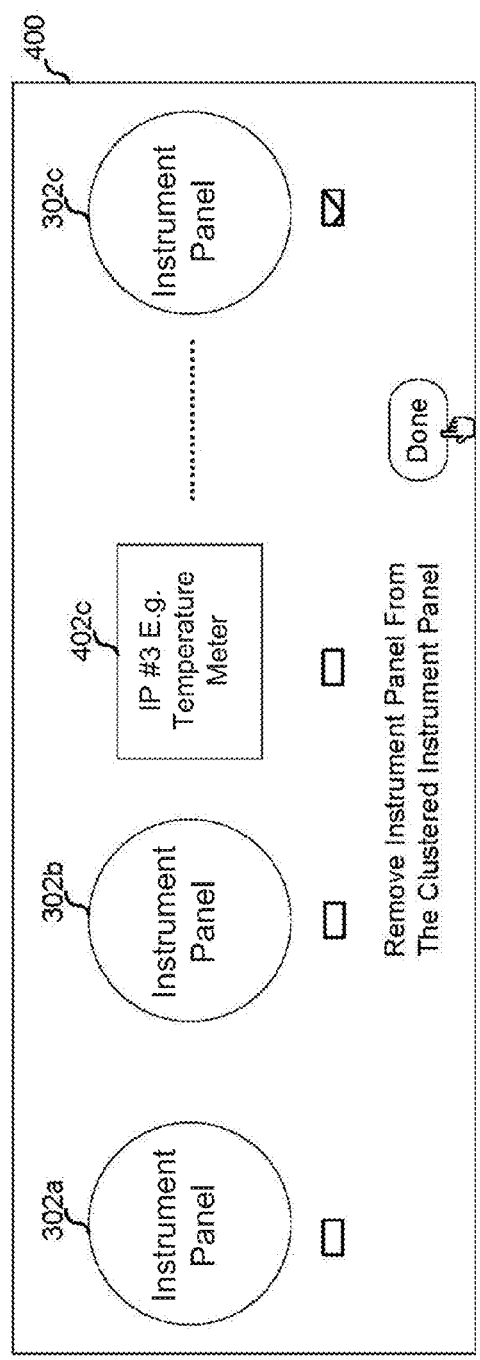
FIG. 4B illustrates an exemplary interface facilitating the user(s) of the transportation apparatus to configure the clustered instrument panel shown in FIG. 1 to remove one or more instrument panels.

In some embodiments, the interface 400 may be configured to enable the user(s) to remove one or more instrument panels from the clustered instrument panel 104a. FIG. 4B illustrates this. As shown, in those embodiments, the interface 400 may be configured to present the instrument panels currently included in the clustered instrument panel 104a. As shown, selection boxes may be provided in the interface 400 to enable the user(s) to remove one or more instrument panels from the clustered instrument panel 104a. In this example, instrument panel 302c is removed from the clustered instrument panel 104a.

Figure 5:
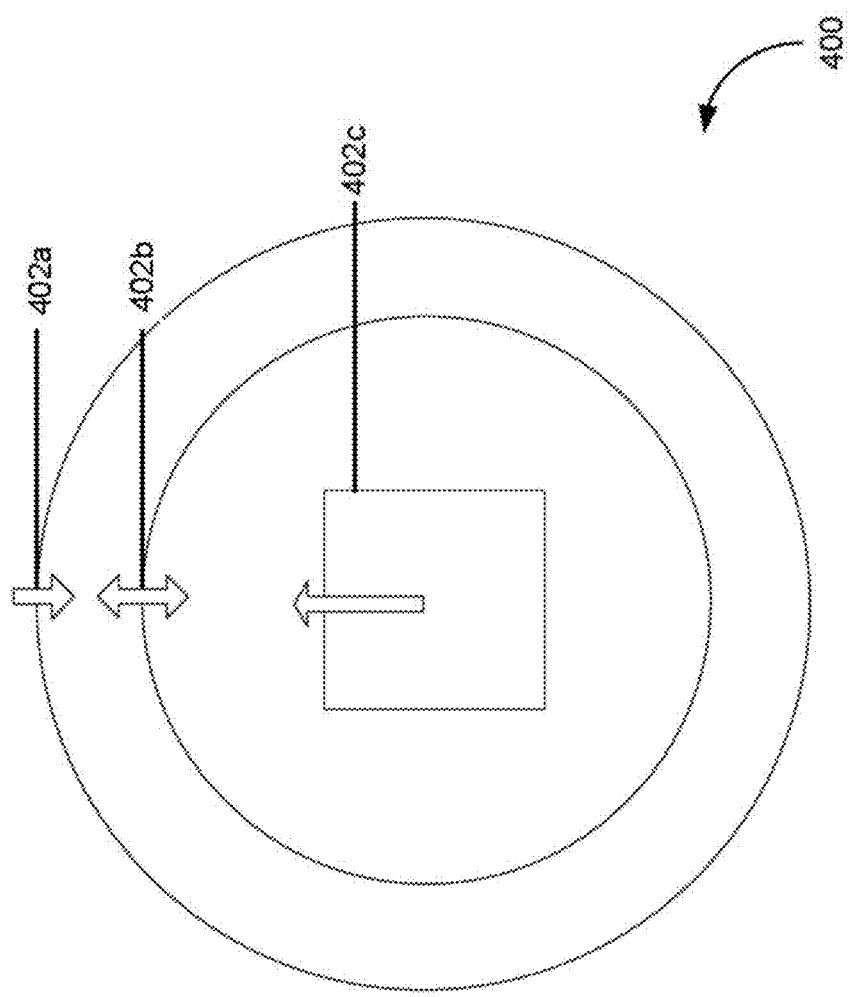
FIG. 5 illustrates an exemplary interface facilitating the user(s) of the transportation apparatus to arrange the position of the individual instrument panels included in the clustered instrument panel shown in FIG. 1.

In some embodiments, the interface 400 may be configured to enable the user(s) of transportation apparatus 100 to arrange the positions of the individual instrument panels in the cluster instrument panel 104a. FIG. 5 illustrates this. As shown in FIG. 5, arrangement of individual instrument panels as configured by the user(s) of the transportation apparatus 100 in FIGS. 4A-B may be initially determined by the transportation apparatus 100 (relevant components for such determination are described in FIG. 6 and FIG. 7). In those embodiments, Interface 400 may enable the user to rearrange the positions of the individual instrument panels.

For example, as shown, the user(s) may be enabled to "swipe" up the instrument panel 402c, to "swipe" up or down the instrument panel 402b, and/or "swipe" down the instrument panel 402a so that the positions of the individual instrument panels may be rearranged as however desired by the user(s) of the transportation apparatus 100.

Figure 6:
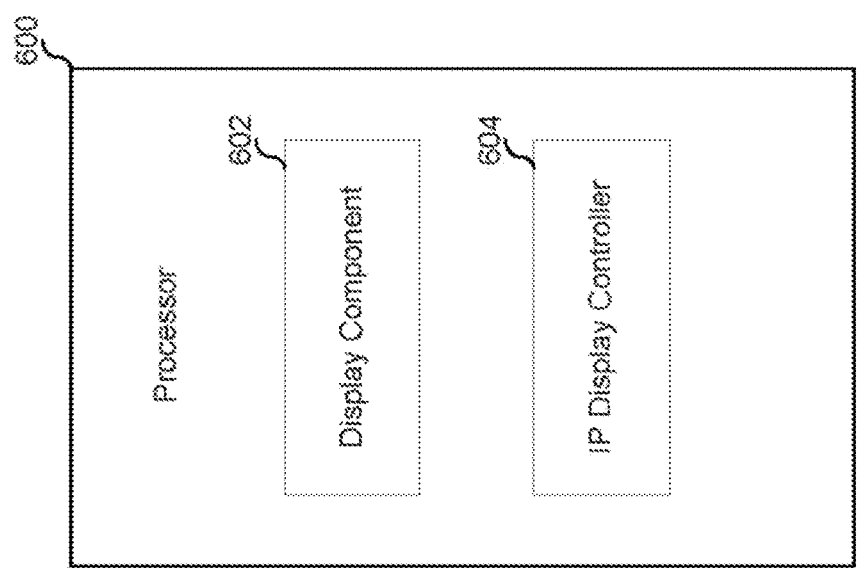
FIG. 6 generally illustrates a block diagram of a processor configured to effectuate the clustered instrument panel in accordance with one embodiment of the disclosure.
Figure 7:
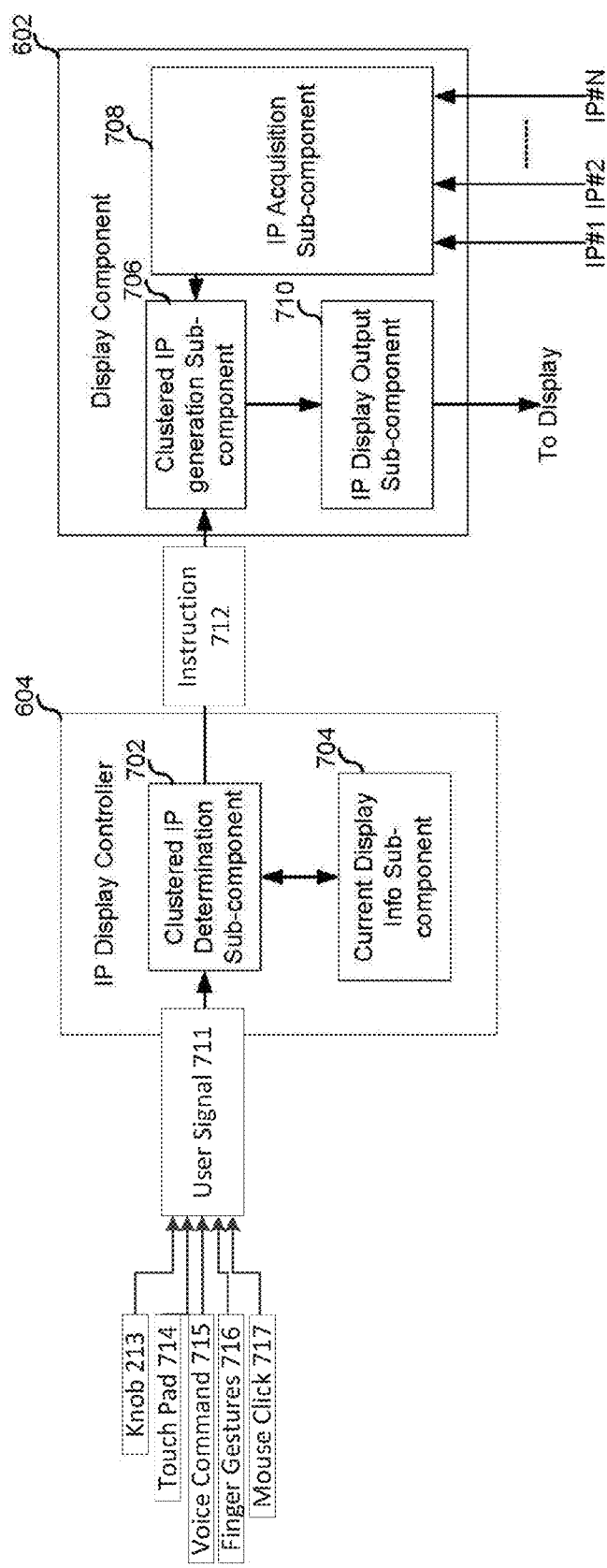
FIG. 7 illustrates one example of the components shown in FIG. 6.

With the clustered instrument panel on a dashboard of transportation apparatus 100 having been generally described, attention is now directed to FIGS. 6-7, where exemplary implementations of the clustered instrument panel are described. FIG. 6 generally illustrates a block diagram of a processor 600 configured to effectuate the clustered instrument panel in accordance with one embodiment of the disclosure. The processor 600 may be included in the transportation apparatus 100. In some examples, the processor 600 is an electronic control unit of the transportation apparatus 100. As shown, in some examples, as in this example, the processor 600 may comprise a display component 602, an information panel display controller 604, and any other components (if any).

The display component 602 may be configured to effectuate display of instrument panels as shown in FIG. 1, which includes clustered instrument panel 104a. In implementations, the display component 602 may be configured to receive indications of multiple information panels for display in a clustered instrument panel, such as the clustered instrument panel 104a. The information panel display controller 604 may be configured to receive user signals indicating selections of the multiple instrument panels for inclusion and display in the clustered instrument panel 104a, generating instructions instructing the display component 602 to display the clustered instrument panel 104a, and/or perform any other operations.

FIG. 7 illustrates one example of the components shown in FIG. 6. It will be described with reference to FIG. 1 and FIG. 6. As shown, the IP display controller 604, in this example, comprises a clustered IP determination sub-component 702, a current display information sub-component 704, and any other components (if any). The clustered IP determination sub-component 702 may be configured to receive user signals. The received user signals may indicate user selection of multiple instrument panels to be combined as a clustered instrument panel, such as the clustered instrument panel 104a. As shown, the user signals may be received from various sources, such as a knob 213 (e.g., dial) on the dashboard 102, a touch pad 714 on a console, a smartphone, a tablet associated with the user(s) of the transportation apparatus 100, finger gestures 716 on the display 103, hand gesture captured by a camera in the transportation apparatus 100, voice command 715, mouse click 717 on an interface presented on a computer (e.g., a laptop) associated with the user(s) of the transportation apparatus 100, and/or any other source. An exemplary interface, i.e., the interface 400 enabling the user to initiate the user signal 711 is illustrated in FIG. 4. As shown in FIG. 7, the received user signal 711 may indicate to combine instrument panels #1, #3, and #4 as the clustered instrument panel 104a.

After receiving the user signals, the clustered IP determination sub-component 702 may request the current display information sub-component 704 to obtain current display information of the information panels requested. The display information obtained by the current display information sub-component 704 may include display sizes, display positions, colors, shapes of the individual instrument panels requested on the display 103 and/or any other display information related to the instrument panels requested.

After receiving the current display information of the requested information panels, the current display info sub-component 704 may be configured to determine a layout of the clustered instrument panel 104a. This may involve comparing the sizes of the instrument panels requested and determine which of the requested instrument panels may be the placed as the outer most panel in the cluster instrument panel 104a, which of the requested instrument panels may be placed as the inner most panel in the clustered instrument panel 104a, and so on. This may involve determining an overall design of the clustered instrument panel 104a based on the colors, shapes, and/or any other visualization aspects of the instrument panels requested. This may involve determining information presentation in the clustered instrument panel 104 in a logical way such that the user(s) of the transportation apparatus 100 may conveniently acquire the information through the clustered instrument panel 104a. Other operations of the current display info subcomponent 704 are contemplated.

In any case, the clustered IP determination sub-component 702 may be configured to generate an instruction 712 to instruct the display component to output the clustered instrument panel 104a to the display 103. The instruction 712 generated by the clustered IP determination sub-component 702 may include the determined size, positions, layout, color of the requested instrument panels to be arranged for the clustered instrument panel 104a. In the example above, the instruction generated by the clustered IP determination sub-component 702 may include specific positions for the instrument panels requested to be included in the clustered instrument panel 104a, e.g., generate a clustered instrument panel: instrument panel #1 at position 1 (inner most), instrument panel #3 at position 2 (middle), and instrument panel #4 at position 3 (outer most).

The display component 602, in this example, comprises a clustered IP generation sub-component 706, an IP acquisition sub-component 708, a display output sub-component 710, and any other components (if any). The clustered IP generation sub-component 706 may be configured to receive instructions from the IP display controller 604. After receiving the instructions, the clustered IP generation sub-component 706 may instruct the IP acquisition sub-component 708 to obtain the individual instrument panels indicated by the received instruction. For example, in the case of the received instructions being "generate a clustered instrument panel: instrument panel #1 at position 1 (inner most), instrument panel #3 at position 2 (middle), and instrument panel #4 at position 3 (outer most)", the IP acquisition sub-component 708 may be instructed to obtain interface information for the instrument panels #1, #3, and #4. The information obtained by the IP acquisition sub-component 708 may be used by the clustered IP generation sub-component 702 to present the requested instrument panels in the clustered instrument panel.

After obtaining the interface information for presenting the information panels, the clustered IP generation sub-component 706 may be configured to generate the clustered instrument panel in accordance with the instruction received. For example, as described above, the received instruction may include specific details as to the design, color, layout, position, and/or any other aspects of the clustered instrument panel 104a to be generated. In that example, the clustered IP generation sub-component 706 may generate clustered instrument panel 104a accordingly. In some examples, the clustered IP generation sub-component 706 may be configured to intelligently determine certain aspects of the clustered instrument panel 104a for generation of the same. For example, as illustration, in one of those examples, the instruction received from the IP display controller may not specifically specify the size of the overall clutched instrument panel 104a to be presented on the display 103. In that example, the clustered IP generation sub-component 706 may be configured to determine the size of the overall clustered instrument panel 104a.

The display output sub-component 710 may receive display information for displaying the clustered instrument panel 104a generated by the clustered IP generation sub-component 706. Based on the received display information, the display output sub-component 710 may output the clustered instrument panel 104a to the display 103.

Figure 8:
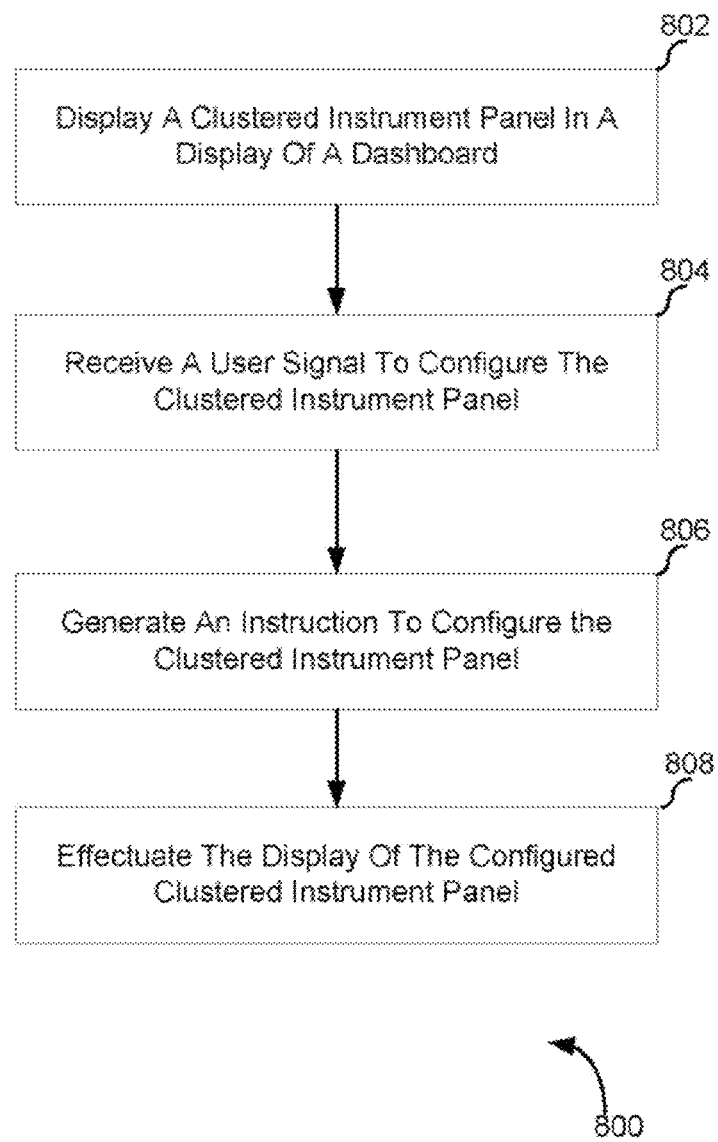
FIG. 8 illustrates one exemplary method for configuring a clustered instrument panel in accordance with the disclosure.

FIG. 8 illustrates one exemplary method for configuring a clustered instrument panel in accordance with the disclosure. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, a clustered instrument panel may be displayed in a display of a dashboard in a transportation apparatus. Examples of such a clustered instrument panel are illustrated in FIGS. 2-3. The clustered instrument panel may convey gauge information related to the transportation apparatus, indication information related to the transportation apparatus, navigational or GPS information related to navigation of the transportation apparatus, environment information, configuration information regarding the transportation apparatus, notification information, and/or any other information.

At an operation 804, a user signal may be received. The received user signal may indicate a request to configure the clustered instrument panel displayed at operation 802. For example, the received user signal may request one or more instrument panels not currently displayed in the clustered instrument panel to be displayed in the clustered instrument panel. As described above, the source of the user signal received at operation 804 may vary. Example of such a source may include a knob (e.g., dial) on the dashboard, a touch pad on a console, a smartphone, a tablet associated with the user(s) of the transportation apparatus, finger gestures on a touch screen on the dashboard, hand gesture captured by a camera in the transportation apparatus, voice control command, mouse click on an interface presented on a computer (e.g., a laptop) associated with the user(s) of the transportation apparatus, and/or any other source.

At an operation 806, an instruction to configure the instrument panel in accordance with the user signal received at operation 804 is generated. For example, an instruction may be generated to configure the clustered instrument panel to include the user requested instrument panel(s). In some examples, operation 806 may be performed by a IP display controller substantially similar to or the same as the IP display controller 604 illustrated and described herein.

At an operation 808, the display of the newly-configured instrument panel may be effectuated. In some examples, operation 808 may be performed by a display component substantially similar to or the same as the display component 602 illustrated and described herein.

Implementations of the invention may be made in hardware, firmware, software, or various combinations thereof. The invention may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A method for enabling a user to configure a clustered information panel for display to a user, the method comprising:
    providing an interface on a display associated with the user;
    presenting, in the interface, to the user, a first instrument panel;
    receiving an input from the user specifying a selection of the first instrument panel for inclusion in the clustered information panel and a first position within the clustered information panel where the first instrument panel is to be displayed; and
    effectuating displaying the first instrument panel at the first position in the clustered information panel.

2. The method of claim 1, further includes presenting, in the interface, to the user, a second instrument panel, and wherein the user input further specifies:
    a selection of the second instrument panel for inclusion in the clustered information panel and a second position within the clustered information panel where the second instrument panel is to be displayed; and, wherein the method further comprises:

generating an instruction for displaying the second instrument panel at the second position in the clustered information panel.

3. The method of claim 1, wherein the user input specifying the selection of the first instrument panel for inclusion in the clustered information panel and the first position within the clustered information panel where the first instrument panel is to be displayed is the first user input, and wherein the method further comprises receiving a second user input indicating a request to remove the first instrument panel from the clustered information panel; and removing the first instrument panel from the clustered information panel in response to the second user input having been received.

4. The method of claim 2, wherein the first and second instrument panels are arranged to be centered on a same center point of the clustered information panel.

5. The method of claim 2, wherein the first and second instrument panels are arranged in concentric rings of the clustered information panel.

6. The method of claim 1, wherein the first instrument panel includes gauge information, navigational or GPS information, and/or configuration information.

7. The method of claim 1, wherein the first instrument panel is a speedometer and the second instrument panel is a tachometer.

8. The method of claim 1, wherein the display associated with the user is a smartphone or a tablet computer.

9. The method of claim 1, wherein the first position as specified by the user input corresponds to an innermost area of the clustered information panel.

10. The method of claim 1, wherein the first position as specified by the user input corresponds to an outermost area of the clustered information panel.

11. The method of claim 1, further comprising generating an instruction to display the first instrument panel at the first position in the clustered information panel and transmitting the instruction to a transportation apparatus for execution via a network.

12. The method of claim 1, wherein the first instrument panel presented to the user in the interface are not currently displayed in the clustered information panel, and wherein the method further comprises:

presenting the clustered information panel currently displayed in the transportation apparatus in the interface to the user.

13. The method of claim 1, wherein the clustered information panel is currently being displayed in a transportation apparatus, and wherein the method further comprises:

presenting the clustered information panel in the interface to the user.

* * * * *